United States Patent
Laegsgaard

(10) Patent No.: US 8,661,561 B2
(45) Date of Patent: Feb. 25, 2014

(54) METAL TIP FOR SCANNING PROBE APPLICATIONS AND METHOD OF PRODUCING THE SAME

(75) Inventor: Erik Laegsgaard, Hojbjerg (DK)

(73) Assignee: SPECS Surface Nano Analysis GmbH, Berlin (DE)

( * ) Notice: Subject to any disclaimer, the term of this patent is extended or adjusted under 35 U.S.C. 154(b) by 0 days.

(21) Appl. No.: 13/389,295

(22) PCT Filed: Aug. 2, 2010

(86) PCT No.: PCT/EP2010/004915
§ 371 (c)(1), (2), (4) Date: Mar. 23, 2012

(87) PCT Pub. No.: WO2011/015378
PCT Pub. Date: Feb. 10, 2011

(65) Prior Publication Data
US 2012/0174269 A1    Jul. 5, 2012

(30) Foreign Application Priority Data
Aug. 7, 2009 (EP) .................................. 09075351

(51) Int. Cl.
*G01Q 70/10* (2010.01)
(52) U.S. Cl.
USPC .................................. 850/57; 850/56; 850/52
(58) Field of Classification Search
None
See application file for complete search history.

(56) References Cited

U.S. PATENT DOCUMENTS

| | | | | |
|---|---|---|---|---|
| 5,015,323 A * | 5/1991 | Gallagher | ................... | 156/345.1 |
| 5,438,206 A * | 8/1995 | Yokoyama et al. | ...... | 250/442.11 |
| 5,714,831 A * | 2/1998 | Walker et al. | ............ | 310/316.01 |
| 6,624,915 B1* | 9/2003 | Kirkpatrick et al. | ............. | 359/3 |
| 7,138,627 B1* | 11/2006 | Nakayama et al. | ............ | 250/306 |
| 7,959,781 B2* | 6/2011 | Lee et al. | ....................... | 204/547 |
| 2002/0063066 A1* | 5/2002 | Ahn et al. | ..................... | 205/642 |
| 2006/0097163 A1* | 5/2006 | Hoen et al. | .................... | 250/309 |
| 2008/0272299 A1* | 11/2008 | Jin et al. | ....................... | 250/310 |
| 2008/0307865 A1* | 12/2008 | Degertekin | .................... | 73/105 |
| 2010/0096265 A1* | 4/2010 | Colbert et al. | ................ | 204/450 |

OTHER PUBLICATIONS

Kimball M: "An improved probe sharpening technique (microelectronics failure analysis)" 19900327; 19900327-19900329, Mar. 27, 1990, pp. 69-71, XP010000778 figure 1 paragraphs [Discussion], [OTIP], [Sharpening], [Procedure].

Klein M et al: "An Improved Lamellae Drop-Off Technique for Sharp Tip Preparation in Scanning Tunneling Microscopy" Review of Scientific Instruments, AIP, Melville, NY, US, vol. 68, No. 8, Aug. 1, 1997, pp. 3099-3103, XP000723520 ISSN: 0034-6748 figures 1-6 paragraphs [000I]-[0III].

(Continued)

*Primary Examiner* — Andrew Smyth
(74) *Attorney, Agent, or Firm* — Rothwell, Figg, Ernst & Manbeck, P.C.

(57) ABSTRACT

A metal tip (1) for scanning probe applications is provided. The tip (1) has an axial extension (I), a radial extension (d), a pointy section (B) that extends axially from a section of maximum radial extension (5) to an atomically sharp end (9), and a blunt section (A) that extends axially from the section of maximum radial extension (5) to a blunt end (7), where the axial extension of the pointy section (B) is larger than the axial extension of the blunt section (A) The metal tip (1) has a mass of 10 μg or less.

15 Claims, 3 Drawing Sheets

(56) References Cited

OTHER PUBLICATIONS

Figure 1:
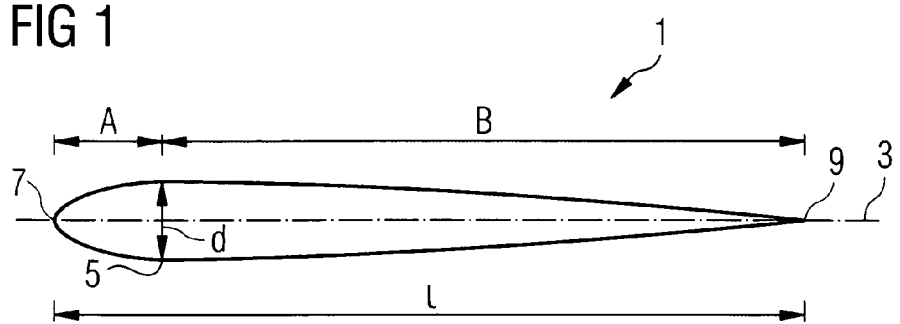

Kulawik M et al: "A double lamellae dropoff etching procedure for tungsten tips attached to tuning fork atomic force microscopy/scanning tunneling microscopy sensors" Review of Scientific Instruments, AIP, Melville, NY, US, vol. 74, No. 2, Feb. 1, 2003, pp. 1027-1030, XP012040487 ISSN: 0034-6748 cited in the application figure 3 paragraphs [0III]-[00IV].

Bryant P J et al: "Technique for shaping scanning tunneling microscope tips" Review of Scientific Instruments, AIP, Melville, NY, US, vol. 58, No. 6, Jun. 1, 1987, p. 1115, XP001329644 ISSN: 0034-6748 the whole document.

Ibe J P et al: "On the electrochemical etching of tips for scanning tunneling microscopy" Journal of Vacuum Science and Technology: Part A, AVS /AIP, Melville, NY., US, vol. 8, No. 4, Jul. 1, 1990, pp. 3570-3575, XP002521993 ISSN: 0734-2101 figure 1 paragraphs [00II], [OIII], [IV.A]-[IV.C].

Kerfriden S et al: "Short Communication—The electrochemical etching of tungsten STM tips" Electrochimica ACTA Elsevier Science Publishers, Barking, GB, vol. 43, No. 12-13, May 5, 1998, pp. 1939-1944, XP004145336 ISSN: 0013-4686 figures 1,2,4 table 1 paragraphs [Experimental], [Results], [0and], [Discussion].

\* cited by examiner

METAL TIP FOR SCANNING PROBE APPLICATIONS AND METHOD OF PRODUCING THE SAME

CROSS REFERENCE TO RELATED APPLICATION

This application is a 35 U.S.C. 371 National Phase Entry Application from PCT/EP2010/004915, filed Aug. 2, 2010, which claims the benefit of European Patent Application No. 09075351.8 filed on Aug. 7, 2009, the disclosure of which is incorporated herein in its entirety by reference.

The present invention relates to a metal tip for scanning probe applications and to a method of producing such a tip. In addition, the present invention relates to a scanning probe microscope sensor.

In scanning probe applications such as, for example, scanning tunnelling microscopy, atomic force microscopy, and related techniques, atomically sharp tips are used for sensing tunnelling currents or forces such as electrostatic forces, magnetic forces, etc. between the tip and a surface to be probed. In a first mode of scanning probe applications tips are located at the end of cantilevers that are brought near to, or in contact to, the surface to be probed and the measurement signal is derived from the deflection of the cantilever. In another imaging mode, an oscillator is used which oscillates at or close to its fundamental resonance frequency or a harmonic thereof. An interaction between the tip and the surface to be probed modifies the amplitude, phase or frequency of the oscillation. Hence, changes in the oscillation frequency, the amplitude or the phase contain information about the surface to be probed. By scanning the sample and monitoring the modifications of the oscillation of the oscillator an image of the sample surface can be derived.

In particular, if an oscillating sensor is used in a scanning probe application a high quality factor (Q-factor) of the oscillation is desired. The Q-factor is a measure for the band width of the oscillator, i.e. the range of frequencies for which the oscillator resonates, and for the degree of damping of the oscillation. The higher Q-factor is the lower are the band width and the degree of damping, which leads to a higher quality image of sample surface.

Production of atomically sharp tips, as they are necessary for scanning probe applications, can be done in different ways. In a first way, a tiny metal wire is cut by a pair of scissors or a scalpel. However, this method of producing the tip requires testing of the tip before using it since the result of the cutting is difficult to reproduce. Another technique of producing tips is etching. Various etching techniques have been described, for example, in U.S. Pat. No. 5,630,932 or in M. Kulawik "A double lamellae drop off etching procedure for tungsten tips attached to tuning fork atomic force microscopy/scanning tunnelling microscopy sensors", Review of Scientific Instruments, vol. 74, No. 2, February 2003. Etching techniques usually rely on immersing a metal wire as a first electrode into an electrolytic etching solution and applying a voltage between the wire and a second electrode located in the etching solution. When the voltage is applied material is removed from the wire in a boundary layer between the etching solution and air. After a while the wire becomes so thin in the boundary layer that the part immersed into the etching solution drops off. Then, the current flowing through the wire and the etching solution is rapidly switched off to stop further etching of the wire, which then is used as the tip. In other etching techniques small ring electrodes are used through which the wire extends. An electrolyte film is located between the wire and the interior surface of the ring electrode so that the etching is performed in the area which is surrounded by the ring electrode. After a while the wire becomes so thin in the etching zone that the lower part of the wire drops off. This part is then used as the tip.

Although the described methods are suitable for producing atomically sharp tips there is still a desire for etched tips which allow for a higher Q-factor with sensors employing tuning forks or similar symmetric resonators.

It is therefore an objective of the present invention to provide a metal tip for use in scanning probe applications which allows for a high Q-factor of oscillating sensors. It is a further objective of the present invention to provide an advantageous etching method of producing metal tips for scanning probe applications. It is a still further objective of the present invention to provide an advantageous scanning probe microscope sensor.

These objective are solved by a metal tip for scanning probe applications as claimed in claim 1, by a scanning probe microscope sensor as claimed in claim 6 and by a method of producing a metal tip for scanning probe applications as claimed in claim 8. The depending claims contain further developments of the invention.

According to a first aspect of the present invention a metal tip for scanning probe applications is provided. The tip has an axial extension, a radial extension, a pointy section that extends axially from a section of maximum radial extension to an atomically sharp end, and a blunt section that extends axially from the section of maximum radial extension to a blunt end. The metal tip has a mass of 10 µg or less, in particular of 5 µg or less, preferably of 3 µg or less. The axial extension of the pointy section is larger than the axial extension of the blunt section.

The inventive low mass metal tips allow for increasing the Q-factors, in particular, of symmetric quartz oscillators in scanning probe microscope sensors so that high quality images of the surface to be probed can be achieved. Moreover, they can be produced by a self-limiting etching process.

The tip may be made of a metal belonging to the groups 6 to 11 and to the periods 4 to 6 of the periodic table or of alloys containing at least of these metals as main component. Exemplary materials the tip may be made of are, in particular, tungsten (W), iridium (Ir), platinum (Pt), or an alloy of platinum and iridium.

Up to now Q-factor improvements have been achieved by attaching an extra mass to the symmetric oscillator to balance the mass of the tip. Such balancing is, for example, described by Boon Ping Ng et al. "Improve performance of scanning probe microscopy by balancing tuning fork bronze" Ultramicroscopy, vol. 109, issue 4, March 2009, pages 291 to 295. With the inventive tip the Q-factor can be improved without using an extra mass since the tip is lower in mass than etched state of the art tips.

Inventive tips can be etched by using the inventive method of producing a metal tip for scanning probe applications. This method comprises the steps of providing an electrolyte into which a first electrode is immersed, partly immersing a wire into the electrolyte as a second electrode, applying a voltage between the first electrode and the wire until the part of the wire which is immersed into the electrolyte drops off, and cleaning the dropped off part from the electrolyte for using it as a metal tip for scanning probe applications. The production of the inventive tip becomes possible in that, according to the inventive method, the wire is partly immersed into the electrolyte by an amount of 600 µm or less, in particular 400 µm or less.

The inventive method is based on the finding that a very tiny part drops off from the wire during the etching when the wire is immersed into electrolyte not more than 600 μm, preferably not more than 400 μm.

The metal tips produced by the inventive method typically have, in addition to the pointy section that extends axially from a section of maximum radial extension to an atomically sharp end, a blunt section that extends axially from the section maximum radial extension to a blunt end, where the axial extension of the pointy section is larger than the axial extension of the blunt section, in particular at least three times larger, and typically 5 to 10 times larger The blunt section may have a oval shape, in particular a circular or an elliptic shape, so that the tip has the shape of an elongated droplet.

The maximum axial extension of the inventive tip, as produced with the inventive method, is 500 μm or less, in particular of 350 μm or less, and its maximum radial extension is 50 μm or less, in particular of 25 μm or less.

In the inventive method of producing the metal tip, the etching of the tip immediately stops as soon as the part immersed into the electrolyte drops off from the wire since it is then not connected to the current source anymore. Hence, the etching of the tips, i.e. the dropped off parts of the wire, is self limiting and switching off the current with a fast breaking switch mechanism is not necessary since a further etching of the remaining wire is not critical.

According to a further development of the inventive method the metal wire is fed forward to immerse a further part of it into the electrolyte after the part of the metal wire which was earlier immersed into the electrolyte has dropped off, and the voltage between the wire and the second electrode is applied again until the further part of the wire drops off. This can be repeated until the desired number of tips is produced or all the wire is consumed. The cleaning step then may take place after a number of parts of the metal wire have dropped of. In other words, a number of tips can be collectively cleaned after the desired length of wire is consumed.

The cleaning may, in particular, be performed by diluting the electrolyte with a diluting agent which dissolves the electrolyte. Diluting the electrolyte may be done by replacing an amount of electrolyte by an equivalent amount of diluting agent. This may also be repeated one or more times.

In order to allow an automated feed forward of wire into the electrolyte the presence of the part of the wire immersed into the electrolyte can be monitored by monitoring the current flow through the wire. As soon as the part which is immersed into the electrolyte drops off the current flowing through the wire to the counter electrode drops which indicates that a further part of the wire may be fed forward.

The wire that is partly immersed into the electrolyte has, preferably, diameter of 100 μm or less, in particular 50 μm or less so that an unnecessary high mass of the tip can be avoided. With thin wires the tip that results from the inventive method is reduced in diameter approximately by a factor of two through the etching process as compared to the original wire. Hence, a wire of an original diameter of 100 μm leads to a tip with a diameter of approximately 50 μm in diameter, and a wire of an original diameter of 50 μm leads to a tip with a diameter of approximately 25 μm.

According to a further aspect of the present invention, a scanning probe microscope sensor (SPM-sensor) is provided which comprises an inventive metal tip. The sensor may, in particular, be a symmetric oscillator with a first oscillator arm and a second oscillator arm to which the tip is fixed. The inventive sensor allows for a high Q-factor which in turn allows for obtaining high quality images of a sample surface to be probed without the use of a counter mass at the first oscillator arm.

Further features, properties and advantages of the present invention will become clear from the following description of embodiments in conjunction with the accompanying drawings.

Figure 2:
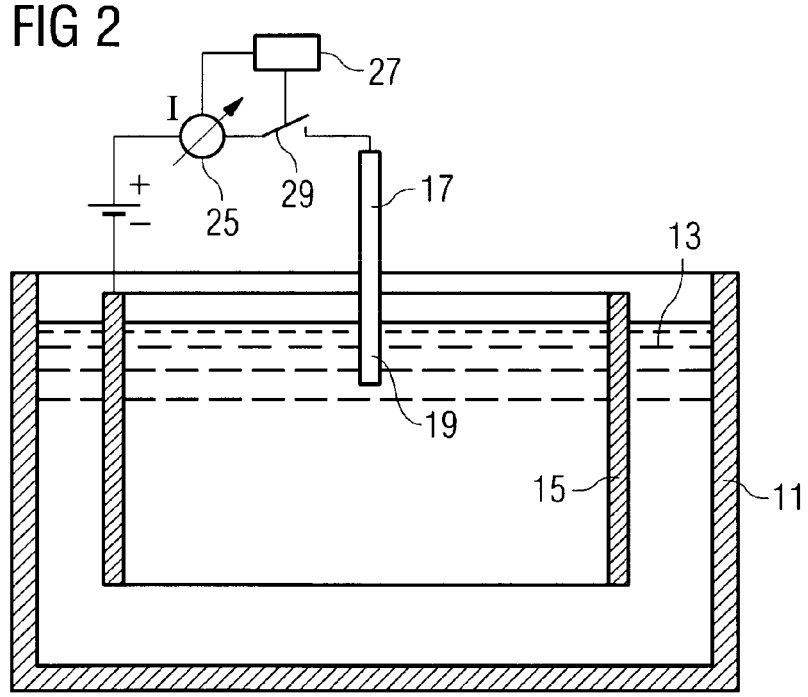
Figure 3:
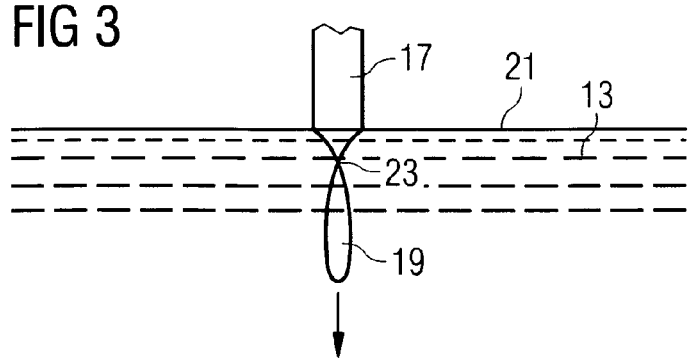
Figure 4:
Figure 5:
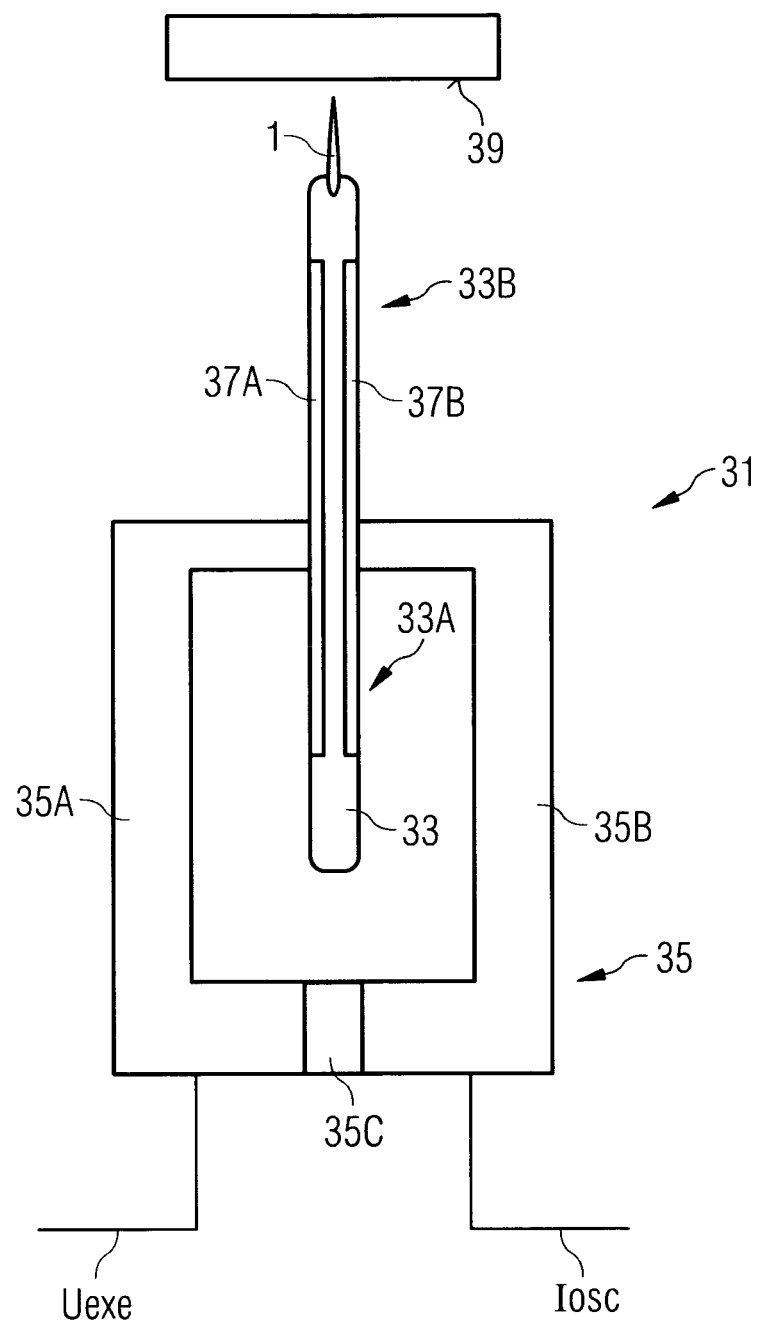

FIG. 1 shows an inventive tip.
FIG. 2 schematically shows an etching system for producing the tip of FIG. 1.
FIG. 3 shows the tip just before the etching is finished.
FIG. 4 shows a number of finished tips as seen through an electron microscope.
FIG. 5 shows an SPM-sensor with an inventive tip.

The features and properties of the inventive tip will be described with reference to FIG. 1. Note that FIG. 1 is only a schematic view and that the ratio of the radial dimension to the axial dimension does not necessarily correspond to the respective ratio of real tips.

The inventive tip 1 has the shape of an elongated droplet with an axial extension I along a longitudinal axis 3 of about 300 to 400 μm, typically about 350 μm. The tip shows radial symmetry with respect to the longitudinal axis 3 and has a section 5 of maximum radial extension d. A blunt section A extends from the section of maximum radial dimension 5 to a blunt end 7, and a pointy section B extending from the section of maximum radial extension 5 to an atomically sharp end 9. The diameter of the tip 1 in the section of maximum radial extension is in the range of 50 μm or less, in particular in the range between 20 and 30 μm, typically 25 μm. The pointy section is much more elongated than the blunt section. Typically, the axial extension of the pointy section is about 5 to 10 times larger than the axial extension of the blunt section.

The tip 1 can be made of a number of materials. Typical materials used for producing tips for scanning probe applications are, in particular tungsten, platinum and iridium. Also alloys like platinum-iridium alloys are often used. However, other materials can, in principle, be used as well. Such other materials are, for example manganese (Mn), iron (Fe), cobalt (Co), nickel (Ni) which are materials of the forth period and the seventh to tenth group of the periodic table. Other materials which are, in principle, suitable for making tips are ruthenium (Ru), rhenium (Re) and palladium (Pd) of the fifth period and the eighth to tenth group of the periodic table. In addition to the already mentioned materials tungsten, iridium and platinum of the sixth period other materials of this period like osmium (Os) and gold (Au) or rhenium (Re) are also suitable. As a rule of thumb, materials contained in the forth to sixth period and the sixth to eleventh group of the periodic table are, in general, suitable for producing the inventive tip.

The mass of the tip 1 is 10 μg or less, in particular 5 μg or less, preferably 3 μg or less. Note that the mass of the tip depends on its dimension as well as on the density of the tip material. In present exemplary embodiment, the tip 1 is made of tungsten which has a density of 19.25 g/cm$^3$. A tungsten cylinder with a length of 350 μm and a diameter of 25 μm would have a mass of about 3.3 μg. Since the major part of the tip more or less resembles a cone its mass would be about ⅓ of the cylinder mass. Hence, the mass of the tungsten tip having a length of 350 μm and a maximum diameter of 25 μm would be in the range of 1 μg. If a material different to tungsten would be used for producing a tip 1 of the same diameter and length as the tungsten tip the mass would scale with the density of the material. However, all materials mentioned above which are within the sixth period, as tungsten, would roughly have the same mass since all those materials have densities about 20 g/cm$^3$. In case of materials taken from the fifth or the forth period a tip with the same dimensions would even be lighter since the densities of these materials are less than the densities of the mentioned materials of the sixth period.

FIG. 2 shows a typical etching system for producing an inventive metal tip 1. The etching system comprises a container 11 filled with an electrolyte 13 which serves as an etching solution. A ring shaped first electrode is immersed into the etching solution. Furthermore, a metal wire 17, from which the metal tip will be formed, is partly immersed into the electrolyte 13 by an amount of 600 μm or less, in particular 400 μm or less. This metal wire 17 forms a second electrode to allow electrolytic etching of the wire part immersed into the electrolyte 13.

For performing the etching process, a DC-voltage is applied between the two electrodes so that material is stripped off from the wire part 19 which is immersed into the electrolyte 13. In this etching process, the highest stripping rate is achieved close to the border between the electrolyte 13 and the surrounding atmosphere, typically air. However, other gases could also be used as atmosphere, for example nitrogen or an inert gas.

The metal wire 17 with the part which is immersed into an electrolyte 13 is shown in FIG. 3 just before the etching process is finished. It can be seen that, due to the highest etching rate being located close to the surface 21 of the electrolyte 13, the material reduction at the wire part 19 immersed into the electrolyte 13 is also the highest close to the electrolyte surface 21. Hence, a constriction 23 forms close to the border between the electrolyte 13 and the atmosphere which eventually becomes so thin that the wire part 19 immersed into the electrolyte 13 drops off from the wire 17 to form the desired metal tip.

The etching process is controlled by monitoring the current flowing between the two electrodes through the electrolyte 13. At the moment the wire part 19 immersed into the electrolyte drops off a sharp decrease of the current flowing through the electrolyte 13 can be observed. A control devise 27 connected to an ampere meter 25 measuring the current flowing through the wire 17 and the electrolyte 13 monitors this current and switches the DC-voltage off by means of controllable switch 29 to which it is also connected if it recognizes a sharp current drop. Note, however, that it is not essential to switch off the DC-voltage quickly since the wire part 19 dropped off is used as tip rather than the remaining wire 17. Hence, the etching process of the tip immediately stops as soon as the wire part 19 drops off from the wire 17. Switching the DC-voltage off only serves for preventing from consumption of too much wire 17 and for allowing to feed a further wire part into the electrolyte 13 without an etching taking place during the wire movement. Switching on the DC-voltage then precisely defines the beginning of the etching.

When the wire 17 has been fed forward so that a further wire part 19 is immersed into the electrolyte 13 by an amount of 600 μm or less, in particular by an amount of 400 μm or less, the switch 29 is closed again by the control device 27 to etch another tip. Since feeding forward can also be controlled by a control device 27 the whole tip forming process can be fully automated.

As a concrete example for forming tip by use of the inventive method forming a tungsten tip will be described. A tungsten wire with a diameter of 50 μm is fed forward into an electrolyte which is, in the present example, sodium hydroxide (NaOH). The wire is immersed into the sodium hydroxide by an amount of 400 μm. To start the etching, a DC-voltage is applied between the tungsten wire, which forms the anode, and the ring shaped electrode 15, which forms the cathode. The etching then takes place at the wire part 19 immersed into the NaOH with the highest etching rate being located close to the atmosphere/electrolyte interface. During application of the DC-voltage the current flowing through the tungsten wire 17 is monitored in order to trace the etching process.

As long as a voltage is applied the etching of a wire proceeds around the immersed wire part 19 with the highest etching rate continuing to be close to the atmosphere/electrolyte interface. Eventually, the diameter of the immersed tungsten wire part close to the atmosphere/liquid interface becomes so thin that the immersed part, which now has the shape of an elongated droplet, drops off from the tungsten wire 17. At this moment, the electrical circuit is interrupted since the tungsten wire is not in direct contact with the electrolyte anymore and, hence, the etching process is stopped automatically. Unlike in other etching processes, not the residual tungsten wire 17 at the atmosphere side is used as a tip but the part 19 which has dropped off. In case additional tips shall be produced the tungsten wire can be fed forward into the electrolyte to immerse a further part of the wire by an amount of 400 μm, into the electrolyte.

With the described etching process, the length of the etched tips can be precisely tuned by adjusting the length of wire which is immersed into the electrolyte. A typical automated process for repeated production of metal tips would comprise the following steps:
1. Dipping the wire into the electrolyte with a defined length being dipped into the electrolyte.
2. Application of a DC-voltage and monitoring of the flowing current.
3. Etching until the measured current breaks down.
4. Switching off the DC-voltage.
5. Feeding the tungsten wire forward by a defined length.
6. Repeating of steps 2 to 5 until the desired number of the tips has been produced or until the metal wire is consumed.

A picture of a number of tips produced according to the described method is shown in FIG. 4. This picture, which is taken with an electron microscope, demonstrates the reproducibility achieved by the inventive etching process.

In order to use the etched tips which typically lie at the bottom of the electrolyte container 11, they need to be cleaned from the electrolyte without mechanically touching them in order to prevent mechanical damage or bending or blunting of the tips. To do so, the electrolyte 13 is successively exchanged by a diluting agent dissolving the electrolyte 13. Typically, distilled water can be used as the diluting agent, in particular in the above example in which sodium hydroxide is used as electrolyte. Diluting the electrolyte 13 is repeated several times with typically replacing two third of the electrolyte by distilled water in each dilution cycle. After a number of dilution cycles the electrolyte is diluted so far that no electrolyte contamination at the tips is observed anymore when taking the tips out of the container 11. In the above example, in which sodium hydroxide is used as electrolyte and distilled water is used as diluting agent, typically five or six diluting cycles are sufficient for cleaning the tips. However, if a higher or lower fraction of the electrolyte, for example one half or one fourth, is replaced by the diluting cycles may be necessary.

Although sodium hydroxide and distilled water have been used as electrolyte and diluting agent other electrolytes and diluting agents may be used as well. In particular, the electrolyte may be chosen in view of the material the metal wire is made of. Similarly, the diluting agent and/or the fraction of replacement may be chosen in view of the used electrolyte. For example, some electrolytes are not dissolvable in water but in alcohol, for instance. Furthermore, it is not necessary to use a DC-voltage in the etching process. AC-voltages could, in principle, be used as well. Furthermore, the temperature of the electrolyte, the magnitude of the voltages, the material and geometry of the counter electrode which is immersed into the electrolyte, or the washing procedure may be changed, in particular in view of the material of the tips to be produced and the used electrolyte.

The inventive tip 1 can be used with a symmetric quartz oscillator of a scanning probe microscope sensor. An embodiment of a scanning probe microscope sensor 31 including a symmetric quartz oscillator is schematically shown in FIG. 5. The sensor comprises a quartz rod 33 forming an oscillator which is supported at its centre by two arms 35A, 35B of a support frame 35. A first arm 33A of the quartz rod 33 extends into the frame 35 and a second arm 33B, to the end of which an inventive tip 1 is fixed, extends away from the frame 35.

The quartz rod 33 comprises two gold coatings 37A, 37B which are applied to circumferential areas of the rod 33 that are turned away from each other. These gold coatings 37A, 37B are isolated against each other and form electrodes that are connected electrically to the arms 35A, 35B, respectively, which are formed of an electrically conducting material and are isolated against each other by a frame section 35C of an electrically non-conducting material. A resonance oscillation of the quartz rod 33 can be excited by applying a sinusoidal exciting voltage $U_{exc}$ to one of the electrodes of the quartz rod 33, in the present example to the electrode 37A, through an arm 35A of the frame 35. The applied voltage causes expansions and contractions of the quartz rod due to the piezo-electric effect. At the second electrode 37B the piezo-electric effect induces charges on the rod surface which can be detected as an oscillating current $I_{osc}$. This current can be measured by means of the second electrode 37B.

When the tip 1 is brought very close to a sample surface to be probed the forces exerted to the tip 1 by the surface 39 influence the resonance oscillation of the rod 33 so that the oscillating current $I_{osc}$ is modulated. This modulation contains information about the surface structure of the sample and, hence, allows for deriving an image of the surface. The surface structure can be imaged with higher quality the higher Q-factor of the resonance oscillation is. A lower mass of the tip 1 attached to the quartz rod 33 allows for a higher Q-factor. Hence, the inventive very low mass tip 1 allows for producing a scanning probe microscope sensor with a very high Q-factor.

Note that the sensor 31 described with respect to FIG. 5 is only one possible configuration of such a sensor. Other configurations are possible, for example, configurations in which a tuning fork like structure is used instead of a linear quartz rod. Moreover, if the tip 1 is contacted electrically conducting through an electrode at the tip end of the quartz rod 33, tunnelling currents between the sample surface and the tip can be measured. Hence, the tip can be used in different kinds of scanning probe microscopes, for example in atomic force microscopes or, if the mentioned electric contact to the tip is present, in scanning tunnelling microscopes.

The present invention provides a very low mass etched tip for scanning probe applications and a method for producing such a tip. Due to its very low mass the tip can be used for producing a scanning probe microscope sensor having a high Q-factor. Furthermore, the etching process for producing the tips is self limiting, i.e. it shuts down automatically once the tip is dropping off. This is a major advantage compared to other techniques which use the atmosphere side of the wire as tip since, in such techniques, fast electronics are necessary to shut down the etching process. The tips can be produced in a highly reproducible manner in an automated etching process.

REFERENCE NUMERALS

A blunt section
B pointy section
1 tip
3 longitudinal axis
5 section of maximum radial extension
7 blunt end
9 atomically sharp end
11 container
13 electrolyte
15 electrode
17 metal wire
19 wire part immersed into the electrolyte
21 surface
23 constriction
25 ampere meter
27 control device
29 switch
31 sensor
33 quartz rod
35 frame
37A gold coating
37B gold coating
39 sample surface
I axial extension
d maximum radial extension

The invention claimed is:

1. A metal tip for scanning probe applications, the tip comprising an axial extension, a radial extension, a pointy section that extends axially from a section of maximum radial extension to an atomically sharp end, and a blunt section that extends axially from the section of maximum radial extension to a blunt end, wherein the axial extension of the pointy section is larger than the axial extension of the blunt section, wherein the tip is an etched tip such that the whole surface of the tip is etched, and wherein the metal tip has a mass of 10 μg or less.

2. The metal tip claimed in claim 1, wherein the maximum axial extension is 500 μm or less.

3. The metal tip claimed in claim 1, wherein the maximum radial extension is 50 μm or less.

4. The metal tip claimed in claim 1, wherein the metal tip is made of a metal which is selected from a material contained in the $6^{th}$ to $11^{th}$ group and the $4^{th}$ to $6^{th}$ period of the periodic table, or of an alloy comprising at least one of these metals as a main component.

5. A scanning probe microscope sensor, comprising:
 a metal tip, wherein the metal tip comprises an axial extension, a radial extension, a pointy section that extends axially from a section of maximum radial extension to an atomically sharp end, and a blunt section that extends axially from the section of maximum radial extension to a blunt end, wherein the axial extension of the pointy section is larger than the axial extension of the blunt section, wherein the tip is an etched tip such that the whole surface of the tip is etched, and wherein the metal tip has a mass of 10 μg or less.

6. The scanning probe microscope sensor as claimed in claim 5, further comprising a symmetric oscillator with a first oscillator arm and a second oscillator arm to which the tip is fixed.

7. A method of producing a metal tip for scanning probe applications comprising the steps of:
 providing an electrolyte filled into a container where a first electrode is immersed into the electrolyte;

immersing a wire as a second electrode into the electrolyte in the container, wherein the wire is immersed into the electrolyte by an amount of 600 µm or less, and wherein a section of the wire is completely immersed into the electrolyte such that only a single section of the wire remains outside the electrolyte;

applying a voltage between the first electrode and the wire until the part of the wire which is immersed into the electrolyte drops off into the electrolyte containing container;

cleaning the dropped off part from the electrolyte for using it as a metal tip for scanning probe applications.

8. The method as claimed in claim 7, further comprising the steps of feeding the metal wire forward to immerse a further part of it into the electrolyte after the part of the metal wire which was earlier immersed into the electrolyte has dropped off and applying the voltage between the first electrode and the wire again until the further part of the wire drops off.

9. The method as claimed in claim 8, wherein the step of cleaning takes place after a number of parts of the metal wire have dropped off.

10. The method as claimed in claim 7, wherein the step of cleaning is performed by diluting the electrolyte with a diluting agent dissolving the electrolyte.

11. The method as claimed in claim 10, wherein the step of diluting the electrolyte is done by replacing an amount of electrolyte by an equivalent amount of the diluting agent.

12. The method as claimed in claim 10, wherein the step of diluting the electrolyte is repeated at least once.

13. The method as claimed in claim 7, wherein dropping off of the part of the wire that is immersed into the electrolyte is monitored by monitoring the current flowing through the wire.

14. The method as claimed in claim 7, wherein the wire has a diameter of 100 µm or less.

15. In a method of scanning a surface, comprising scanning the surface with a scanning probe, the improvement comprising using a scanning probe having a metal tip comprising an axial extension, a radial extension, a pointy section that extends axially from a section of maximum radial extension to an atomically sharp end, and a blunt section that extends axially from the section of maximum radial extension to a blunt end, wherein the axial extension of the pointy section is larger than the axial extension of the blunt section, wherein the tip is an etched tip such that the whole surface of the tip is etched, and wherein the metal tip has a mass of 10 µg or less.

* * * * *